United States Patent [19]

Eastmond et al.

[11] Patent Number: 5,371,623
[45] Date of Patent: Dec. 6, 1994

[54] HIGH BIT RATE INFRARED COMMUNICATION SYSTEM FOR OVERCOMING MULTIPATH

[75] Inventors: Bruce C. Eastmond, Downers Grove; Rachid Alameh, Schaumburg; Thomas A. Freeburg, Arlington Heights, all of Ill.

[73] Assignee: Motorola, Inc., Schaumburg, Ill.

[21] Appl. No.: 907,468

[22] Filed: Jul. 1, 1992

[51] Int. Cl.$^5$ .............................. H04B 10/10
[52] U.S. Cl. ..................... 359/167; 359/178; 359/189; 455/135
[58] Field of Search ............... 359/137, 138, 157, 161, 359/164, 165, 167, 189, 353, 118; 455/52.1, 52.3, 133, 134, 135, 137; 375/100, 101

[56] References Cited

U.S. PATENT DOCUMENTS

| | | | |
|---|---|---|---|
| 4,531,238 | 7/1985 | Rawson et al. | 359/164 |
| 4,727,600 | 2/1988 | Avakian | 359/165 |
| 4,792,998 | 12/1988 | Toussaint | 359/189 |
| 4,809,362 | 2/1989 | Claus et al. | 359/187 |
| 4,864,651 | 9/1989 | Ogiwara et al. | 359/161 |
| 4,975,926 | 12/1990 | Knapp | 375/1 |
| 4,977,618 | 12/1990 | Allen | 359/121 |
| 5,068,916 | 11/1991 | Harrison et al. | 455/39 |
| 5,099,346 | 3/1992 | Lee et al. | 359/118 |
| 5,119,226 | 6/1992 | Allen et al. | 359/172 |

Primary Examiner—Benedict V. Safourek
Attorney, Agent, or Firm—Val Jean F. Hillman

[57] ABSTRACT

A wireless infrared (IR) communications system (100) for communicating packetized information (302) between a control module (12) and a plurality of UMs (14) via infrared transceivers (300/320) is described as having a selectable communications path. In this system at least the user module (14) has a plurality of IR device arrays (A1-A6) for receiving IR signals (312/312') in relatively narrow IR field of view sectors, and selection circuit (20), coupled to said plurality of IR device arrays (A1-A6), for selecting a communication path between the control module (12) and one of said plurality of IR device arrays (A1-A6), based at least partly on received signal (302') qualtity, so as to overcome reception errors caused by multipath interference.

13 Claims, 2 Drawing Sheets

HIGH BIT RATE INFRARED COMMUNICATION SYSTEM FOR OVERCOMING MULTIPATH

FIELD OF THE INVENTION

This invention relates generally to a high data rate infrared radiation (IR) communication system, and more particularly, to a method and apparatus for overcoming reception errors caused by multipath interference in such an IR communication system.

BACKGROUND OF THE INVENTION

In a typical wireless communication system to transmit data at high data rates, communication is severely impaired as a result of multipath interference. Multipath interference results in such systems when two or more signals are received offset in time. This often occurs in an environment having signal deflecting structures. Each signal deflection delays the arrival of the transmitted signal. These deflections can generate signals having differential path delays exceeding a substantial fraction of the data symbol duration, e.g., where the differential path delay is more than half of the data symbol width, thereby causing overlapping signals that impair or destroy signal intelligibility at the receiver.

Traditionally infrared radiation (IR) communication systems avoided this problem by transmitting data at relatively low data bit rates. By employing low data bit rates, the data symbol duration is much longer than the typical differential path delay due to multipath. Hence, any resultant interference is negligible. Unfortunately, low data bit rate communication is rapidly becoming unacceptable as system designers attempt to meet the demands for high capacity IR communication systems which can efficiently accommodate digitized voice and data. Accordingly, the prior art reflects various methods and devices designed to overcome the effects of multipath interference in a high bit rate IR communication system. One method commonly suggested is channel equalization.

Channel equalization methods typically employ some form of equalization scheme such as, for example, linear equalization, decision feedback equalization (DFE), or maximum-likelihood sequence estimation (MLSE) equalization on the received data in order to correct for the intersymbol interference (ISI) caused by channel-induced distortions such as multipath and Rayleigh fading. As will be appreciated by those skilled in the art, equalization is a very complex and expensive solution to multipath interference, which in many application is impracticable.

Other solutions include point-to-point, multipoint or otherwise aimed communication links. As will be appreciated, however, point-to-point, multipoint or otherwise aimed communication links require either fiber optic cables, direct free-space aimed or reflectively aimed transmission, and therefore typically fail to provide uniform service throughout an area of geographic coverage (cell).

It would therefore be extremely advantageous to provide a wireless IR data communication system which overcomes the problems associated with the prior art.

SUMMARY OF THE INVENTION

Briefly described, the present invention is a method and apparatus for use within a wireless infrared (IR) communications system for selecting a communication path between a CM and at least one UM employing infrared transceivers. In this effort at least the UM comprises a plurality of IR device arrays for receiving IR signals in relatively narrow IR field of view sectors, and selection means, coupled to said plurality of IR device arrays, for selecting a communication path between the CM and one of said plurality of IR device arrays, based at least partly on received signal quality, so as to overcome reception errors caused by multipath interference.

DESCRIPTION OF A PREFERRED EMBODIMENT

The arrangement disclosed in this specification is directed to high data rate transmission via infrared radiation (IR) in a data communication system. More particularly, the arrangement disclosed herein is directed to employing such communication in a multipath environment such as the in-building deployment of a wireless IR local area network (LAN).

Figure 1:
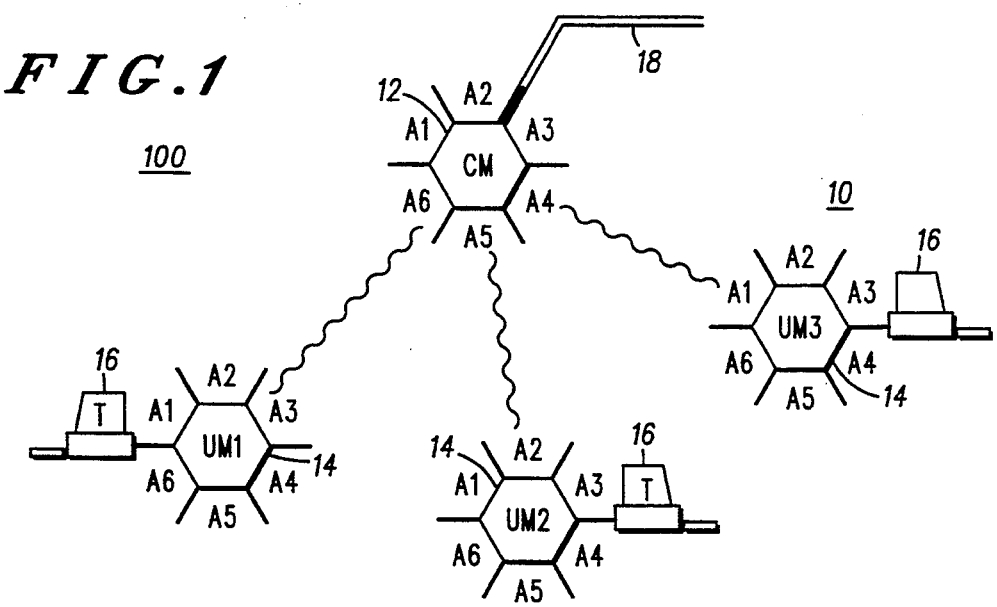
FIG. 1 illustrates a wireless packet communication system suited for incorporating the present invention.

FIG. 1 illustrates a wireless packet communication system 100 in which a control module 12 utilizes infrared radiation (IR) to communicate with user modules 14 that are each coupled to one or more user devices 16 consisting of a terminal, personal computer, telephone, or other information input/output device. In the illustrative system, the control module 12 is also coupled by a data channel 18 to a data network. The control module (CM) 12 controls communications within the illustrated network and passes information from the data network via channel 18 to user devices 16 via the associated user module (UM) 14 utilizing IR. The control module also controls local communications by receiving information from one user module and relaying the information to a different user module. The wireless information is conveyed in the form of packets. The data network to which control module 10 is connected may consist of an Ethernet network.

In the illustrative embodiment, the CM and UMs communicate with each other using any one of six directional IR arrays A1–A6 oriented to cover a 360° field of view (FOV) in the horizontal plane. Depending on the position of the UMs relative to the CM, a different IR array will likely provide the best communications path. It should also be noted that for such a system installed in a building, a direct communications path may not always be available because of obstacles or may change due to the movement of people. Thus different IR arrays will be utilized between a UM and a CM based upon the signalling environment and changes therein.

Figure 2:
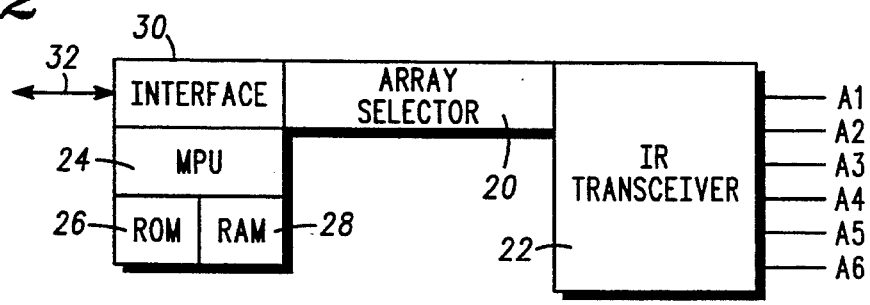
FIG. 2 is a block diagram of a packet device in accordance with the present invention and suited for use in the system shown in FIG. 1.

FIG. 2 illustrates a block diagram of an embodiment of a structure common to both the CM and UM. An IR transceiver 22 modulates digital data onto a current signal to transmit the desired data and its receiver convert received IR signals into corresponding digital data. Any one of the IR arrays A1–A6 can be selected by the array selector 20, to transmit and/or receive IR signals. Each IR array A1–A6 may comprise IR emitters and detectors, preferably arranged to provide uniform coverage in a horizontal plane with appropriate vertical field of view (FOV) widths to provide latitude for the reception of signals from virtually any location relative to the CM or UM. It will be apparent to those skilled in the art that array selector 20 may be physically housed within transceiver 22 if desired.

A Microprocessor 24 operates under the control of an operating system contained in read only memory 26 and utilizes random access memory 28. The microprocessor 24 controls in bound and out bound data carried by path 32, the array selector 20 and the IR transceiver 22. An interface 30 may consist of the line drivers, input/output buffers and registers as is conventional in microprocessor systems. The path 32 corresponds to communication channel 18 when the embodiment is utilized as a CM and corresponds to the connection to a terminal 16 when the embodiment is utilized as a UM.

In accordance with the preferred embodiment, the array selector 20 in conjunction with the microprocessor 24 is capable of selecting any one of the six IR arrays A1–A6 for transmission and reception of IR signals. In order to rapidly select one of the available arrays, electronic switching is preferably utilized. It will be apparent to those skilled in the art that conventional mechanical switching is a viable alternative. The microprocessor operation relating to array selection is explained below.

In the illustrated embodiment, communications between the CM and UMs is accomplished using a time division multiple access system in which packets of data are transmitted via IR signals. The CM send packets containing an address and other related overhead information along with data destined for a user module which will recognize this information by means of its unique address. Similarly, the user modules transmit messages to a CM's addressed for the CM itself or another UM. Part of the information transmitted by each CM is the periodic transmission of reference packets which are received by the UMs. The bit error rate or other merit factor associated with the reception of the reference packets is utilized in the array selection process which will be described below.

Figure 3:
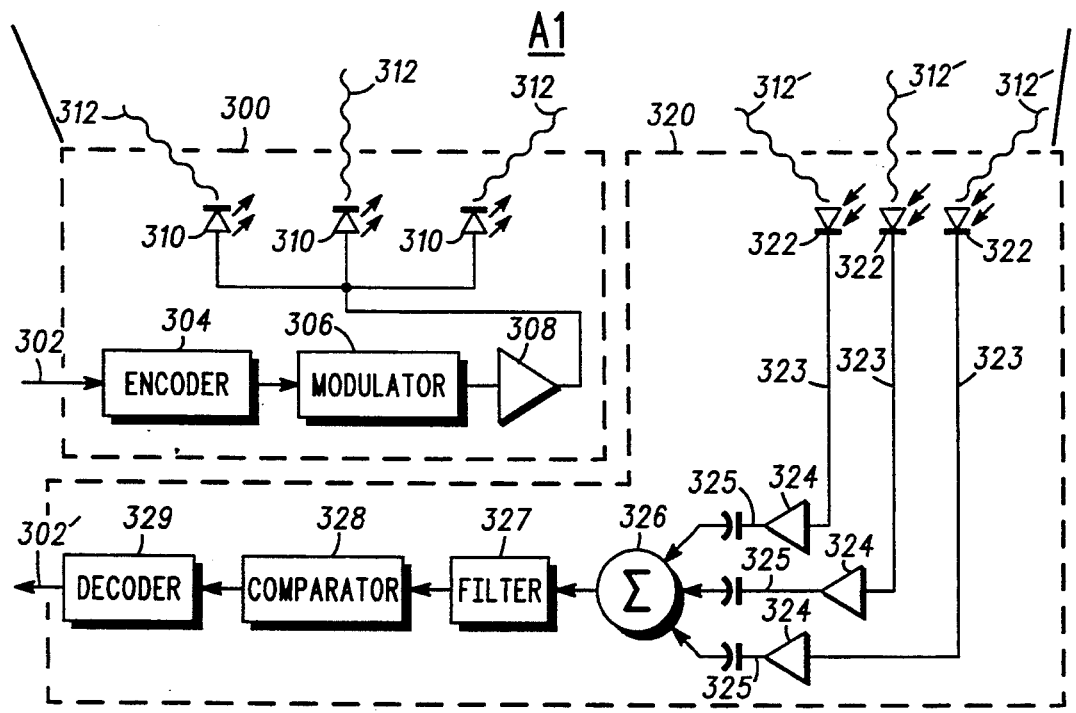
FIG. 3 is a partial block diagram of the IR transceiver as shown in FIG. 2.

FIG. 3 is a partial block diagram of the IR transceiver 22 as shown in FIG. 2. This device has a transmitter block 300 and a receiver block 320. In accordance with the preferred embodiment, each IR device array A1–A6 has an associated transmit block 300 and receive block 320. Since they are all identical, only the transmit and receive blocks for the array A1 is illustrated.

In the transmit mode, the transmitter block 300 receives a binary input signal 302 representing packetized data communicated from the interface 30 via array selector 20 of FIG. 2. This information is routed to an encoder 304 which encodes the information prior to intensity-modulation by modulator 306. In accordance with the preferred embodiment, the encoder 304 performs Manchester bi-phase encoding of the input data. Manchester encoding is performed in order to efficiently utilize the available modulation bandwidth thereby increasing the data bit rate supportable by the reception of diffuse IR signals. While Manchester bi-phase encoding is suggested, it will be appreciated by those skilled in the art that other forms of encoding may also be employed.

The encoded data is then routed to the intensity modulator 306 which transforms the encoded data into coded pulses. These pulses are coupled to a driver 308 in order to increase the current driving capability of the modulated signal. The output from the driver 308 is applied to one or more light emitting diodes (LEDs) 310. Each LED receives the modulated signal having increased drive and emits in response thereto, an infrared radiation signal 312, representative of the packetized input signal 302. Each LED 310 may have an individual driver circuit 308.

While only three LEDs are depicted, it will be appreciated by those skilled in the art that any number of LEDs located and arranged in a generally horizontal plane and providing a uniform pattern of IR coverage within the FOV defined by the array A1 is consistent with the teaching of the present invention. In accordance with the preferred embodiment each array A1–A6 comprises a 60° FOV sector utilizing 24 LEDs to provide the IR coverage. While not shown, the infrared signals 312 will reflect off reflecting surfaces with some amount of dispersion such that the reflected IR signals 312' will radiate in all directions for possible reception by devices within the geographic area covered by the array A1.

In the receive mode, either reflected infrared radiation 312' or infrared signals 312 are detected by a plurality of photodiodes 322. In the illustrative embodiment three photodiodes 322 are located in a generally horizontal plane to provide a uniform pattern of coverage within the associated array A1. While only three photodiodes are shown, it will be appreciated by those skilled in the art that any number of photodiodes, located and arranged in a generally horizontal plane with appropriate vertical FOV widths to provide latitude for the reception of signals from virtually any location, relative to a CM and/or a UM, within the FOV defined by the array A1 is consistent with the teaching of the present invention. In accordance with the preferred embodiment each array A1–A6 comprises a 60° FOV utilizing 6 photodiodes to provide the desired IR coverage.

In accordance with the preferred embodiment, an apparatus for obtaining increased gain may be imposed between the received IR radiation signals 312 and 312' and the photodiodes 322. This apparatus may consist of appropriate lenses or reflectors which will maintain a uniform value of gain over the desird field of view.

As is known, a photodiode 322 is a photon-to-current converter. In accordance, a detected IR signal 312' is converted to electrical signal 323 representative of the encoded and intensity modulated packetized data generated by the transmitter block 300. In order to recapture the packetized information, each photodiode 322 is coupled to a transimpedance amplifier circuit 324. The transimpedance amplifier circuit 324 performs a current-to-voltage transformation of the electrical signal 323 to provide voltage signal 325.

In accordance with the preferred embodiment, the voltage signals 325 are capacitively coupled to a summing network 326 which sums the voltage signals 325 in order to provide a signal of sufficient gain to realize a desired receiver 320 sensitivity. The coupling capacitors are employed to prevent overloading of the summing network 326 by the receipt of high intensity ambient optical signals such as sunlight. In accordance with the preferred embodiment, the summing network 326 is a summing amplifier like those known in the art.

Prior to data detection, a bandpass filter 327 is employed to filter the summation signal and reject any low frequency optical noise from sources such as fluorescent lights and to bandlimit resistive noise from previous amplifier stages so as to maximize the overall receiver noise figure. Thereafter, a comparator 328 is employed to detect the presence of Manchester encoded data in the bandpass filter 327 output. Finally, decoder circuit 329 is employed to decode the Manchester data in order to recover a replica 302' of the packetized input signal 302 which in turn is routed to the array selector 20 of FIG. 2. A detected bit error rate associated with the reception of said information at each of the arrays A1-A6 is utilized in the array selection process which will be described below.

A preferred embodiment, according to the present invention, employs multiple sectors provided by the multiple arrays A1-A6 at a receiving UM or CM to overcome multipath interference. In this effort the device receiving the multipath signal evaluates the signal at each of the multiple sectors and selects to use the data that is received via the path which has the least amount of signal degradation caused by multipath interference. This selected path is then used for subsequent transmission of data between the devices in a duplex operation.

In another preferred embodiment, all six sectors created at each CM and UM are employed to overcome the multipath problem. Such an implementation provides 36 transmission paths from which to choose to overcome the multipath problem. Essentially, the 36 paths result from providing six sectors from which a signal is transmitted and six sectors from which a signal is received. Although any number of sectors may be chosen at either device, the six sectors that are shown provide more than an adequate number of options for overcoming multipath in the typical in-building office environment.

As previously mentioned, the Microprocessor 24 operating under the control of an operating system contained in read only memory 26 has overall control of a CM 12 or UM 14. In accordance, it is the microprocessor 24 that analyzes the received data 302' determines the quality of the transmission paths between the CM and UMs and stores the path information in a table in RAM memory 28.

Before the structure of the table is discussed, some background of the system communication process is needed. At the CM, a special TDMA data transmission, referred to as a "sounding pulse", is transmitted via each of the six sector arrays in sequence. At the UM, for example UM1 of FIG. 1, the six "sounding pulse" transmissions are received are received on one sector array (A1-A6). After receiving this TDMA transmission, repeated six times, at the one sector array, e.g., array A1, the UM1 receives the next TDMA transmissions, repeated six times, on the next array, e.g., array A2. This process continues throughout system operation.

The table stored in RAM memory 28 is used to prioritize the transmission paths. For example, after receiving and analyzing data on sector array A1, the microprocessor 24 of UM1 identifies that the data was transmitted from CM array sector A5. A quality measurement is made for the communication made therebetween and stored for path 5-A1. A similar measurement and record is made after each TDMA transmission is received. After each quality measurement is made for the corresponding communication path (CM array sector to UM array sector), the measurement is compared to measurements made for other communication paths between the CM and the UM. Based upon such comparisons, each measurement is ranked. At any given time, the table may include the following CM/UM path data entries:

| Path | Quality | Rank |
|------|---------|------|
| 5-A1 | 26 | 3 |
| 2-A3 | 29 | 2 |
| 6-A5 | 19 | 27 |
| . | . | . |
| . | . | . |
| . | . | . |
| 1-A2 | 40 | 1 |
| 3-A4 | 2 | 36 | where the highest quality is 50, the lowest is a 1; and the highest rank is a 1, the lowest rank is 36.

The system accommodates such an analysis and measuring by employing packet data transmission. Thus, each packet that is transmitted from an array sector includes a packet header, data, and validation information. The header preferably includes identification information including the source device and the transmitting sector array. Using this information, the receiving device, in this case UM1, can readily determine the sector array which was used to transmit the packet in order to provide an appropriate entry in the RAM memory table.

The quality measurements made for the table are used to establish the ranked order of preference. The better the quality, the higher the rank. In accordance with the preferred embodiment, signal quality may be measured by determining how many transmitted symbols exceed a predetermined receiver demodulation window or may be based upon other known signal quality type measurements such as bit error rate (BER). Such measuring and ranking continues so long as information is received by the UM.

After each UM completes a path selection table for each of the CMs with which it can communicate, the UM makes a determination of the best CM sector array. This determination is transmitted from the UM to each respective CM thereby informing the CM which of its sector arrays to use when communicating with the UM. The UM sector array to be utilized for each CM is selected at the UM based upon the path selection table. Since the table at the UM is based upon IR signals received from a CM, it will be apparent to those skilled in the art that this system relies upon the principal of reciprocity in making the CM IR sector array selection, i.e. it is assumed that the best IR sector array for transmitting from the CM to the UM is also the best IR sector array for receiving IR signals from the UM. This method according to the present invention allows additional UMs to be installed subsequent to initial system configuration with automatic reconfiguration and selection of the best IR sector array choices.

Figure 4:
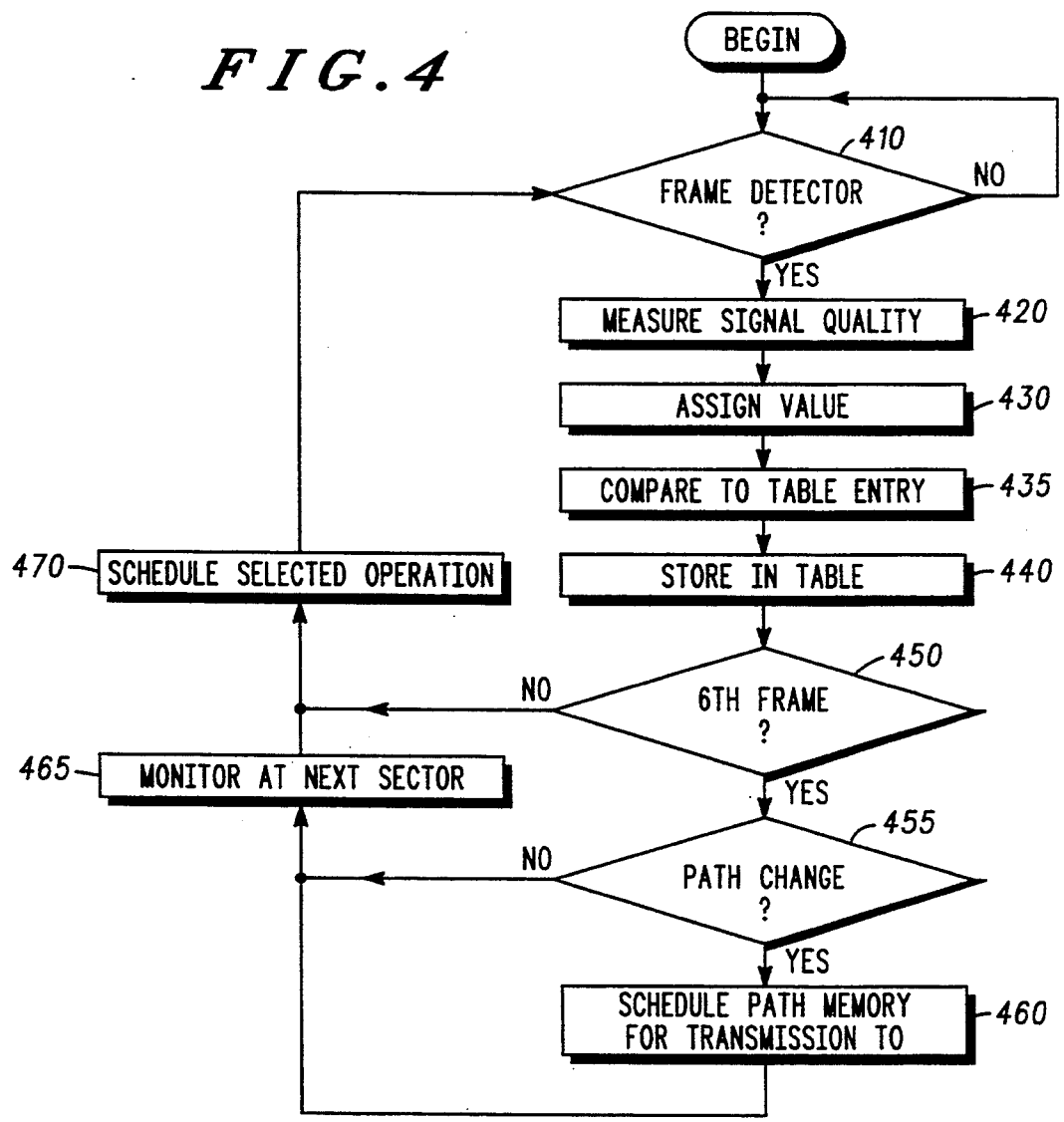
FIG. 4 illustrates a flow chart diagram of the steps performed in accordance with the present invention to determine the best UM to CM communication path in order to overcome reception errors caused by multipath interference.

FIG. 4 is a flow chart diagram of an exemplary method in accordance with-the present invention for determining the best UM to CM communication path in order to overcome multipath in a high bit rate IR communication system. The flow chart begins at block 410 where a test is performed to determine if a replica signal 302' frame corresponding to a "sounding pulse" has been detected. If the "sounding pulse" replica signal 302' frame has not been detected, monitoring continues. If the "sounding pulse" replica signal frame has been detected, flow proceeds to to block 420 where the signal quality of the received signal is measured. At block 430 a quality value is assigned to the communication path which provided the received information. At block 435, the assigned value (from block 430) is compared to the quality values recorded for the other communication paths in the table. Thereafter, each communication path is is ranked to indicate the appropriateness of that path with respect to the other 35 communication paths. At block 440 the ranking and the quality is stored in the communication path memory table.

At block 450 a test is performed to determine if six such replica signal frames have been analyzed, measured and ranked. If the sixth replica signal corresponding to the "sounding pulse" frame has not been received, flow proceeds to block 470 where the appropriate UM activity is scheduled for operation.

Upon receipt of the sixth replica signal corresponding to the "sounding pulse" frame, flow proceeds to block 455 where a test is performed to determine whether a change in the selected communication path is required. It should be noted that a path change at block 455 should not occur each time a different communication path reaches the highest quality ranking. Thus, in order to avoid service disruption due to instantaneous changes in the best communication path, a communications path is preferably changed only after it maintains the highest ranking for a predetermined period of time. Selection of the appropriate time period is best done on a system by system basis.

If a communication path change is required, flow proceeds to block 460 where the UM schedules a path change message for transmission to the CM so that the CM can record which IR sector array to receive signals from the UM. If a path change is not necessary, flow proceeds to block 465 where the UM begins monitoring from the next sector array under the previously described process.

What is claimed is:

1. For use in a infrared (IR) communication system having a first terminal and a second terminal for communicating data there between by means of a light signal communication path, such communication being subject to substantial multipath interference caused by the reception of multiple signals having differential path delays exceeding a substantial fraction of the data symbol duration, at least a first terminal, comprising:
    a plurality of IR device arrays for receiving IR signals in relatively narrow IR field of view sectors; and
    selection means, coupled to said plurality of IR device arrays, for selecting one of said plurality of IR device arrays, based at least partly on received IR signal quality, so as to overcome reception errors caused by multipath interference.

2. The terminal of claim 1 wherein said plurality of IR device arrays comprise photon-to-current converters.

3. The terminal of claim 1 wherein each IR device array is arranged to provide a uniform pattern of IR coverage within the IR field of view sector.

4. The terminal of claim 1 wherein each IR device array defines a 60° field of view sector.

5. The terminal of claim 1 wherein the plurality of IR device arrays defines a 360° field of view.

6. The terminal of claim 1 wherein the selection means is a switch.

7. The terminal of claim 1 wherein the selection means includes memory means for continually tracking a best communication path.

8. The terminal of claim 1 further comprising circuit means for demodulating the received IR signals to detect communicated data; and means, coupled to the demodulating means for detecting a bit error rate (BER) for the communicated data.

9. The terminal of claim 8 wherein received signal quality, is determined as a function of the detected bit error rate (BER).

10. A wireless IR communications system including a control module and at least one user module capable of communicating packetized information to the control module via communication paths, the user module comprising:
    a plurality of IR device arrays for receiving IR signals from the control module in relatively narrow IR field of view sectors;
    means, coupled to the plurality of IR device arrays, for determining the quality of the IR signals received by each of the plurality of IR device arrays;
    means, coupled to the determining means, for ranking the quality of the IR signals received by each one of the plurality of IR device arrays; and
    selection means, coupled to the ranking means, for selecting one of said plurality of IR device arrays, based at least partly on the ranking, so as to overcome reception errors caused by multipath interference.

11. The user module according to claim 10 further comprising means for periodically generating new rankings based on new determinations of signal quality.

12. The user module according to claim 10 wherein the means for determining the quality of signal received from the control module is a Bit Error Detector.

13. In wireless IR communications system wherein packetized data is communicated between a control module and at least one user module via a plurality of IR device arrays, such communication being subject to substantial multipath interference caused by the reception of multiple signals having differential path delays exceeding a substantial fraction of the data symbol duration, a method for choosing one IR device array from among a plurality of IR device arrays coupled to the user module comprising the steps of:
    selecting each IR device array from among a plurality of IR device arrays that cover different geographic areas relative to the user module;
    determining the quality of data signals received from the control module on each of said IR device arrays;
    ranking each of said IR device arrays according to the determined quality; and
    selecting a particular IR device array from among the plurality and for use in communicating with the control module based on the highest ranking.

* * * * *